United States Patent [19]
Dow et al.

[11] Patent Number: 5,467,675
[45] Date of Patent: Nov. 21, 1995

[54] APPARATUS AND METHOD FOR FORMING A WORKPIECE SURFACE INTO A NON-ROTATIONALLY SYMMETRIC SHAPE

[75] Inventors: Thomas A. Dow; Kenneth P. Garrard; George M. Moorefield, II, all of Raleigh; Lauren W. Taylor, Cary, all of N.C.

[73] Assignee: North Carolina State University, Raleigh, N.C.

[21] Appl. No.: 393,890

[22] Filed: Feb. 24, 1995

Related U.S. Application Data

[63] Continuation of Ser. No. 138,163, Nov. 15, 1993, abandoned.

[51] Int. Cl.⁶ .............................. B23B 5/24; B23B 5/40; B23B 1/00
[52] U.S. Cl. .................. 82/1.11; 82/118; 82/137
[58] Field of Search ............... 82/1.11, 18, 118, 82/137

[56] References Cited

U.S. PATENT DOCUMENTS

| | | | |
|---|---|---|---|
| 4,203,062 | 5/1980 | Bathen | 82/137 |
| 4,561,333 | 12/1985 | Kohno et al. | 82/1.11 |
| 4,653,360 | 3/1987 | Compton | 82/18 |
| 5,022,797 | 6/1991 | Sawa et al. | 82/1.11 |

OTHER PUBLICATIONS

M. C. Gerchman, *A Description of OFF–Axis Conic Surfaces for Non–Axisymmetric Surface Generation*, SPIE Proceedings 1266, (Mar. 15, 1990).

S. R. Patterson and E. B. Magrab, *Design and testing of a fast tool servo for diamond turning*, Precision Engineering 7, pp. 123–128 (1985).

T. A. Dow et al., *Application of a fast tool servo for diamond turning of nonrotationally symmetric surfaces*, Precision Engineering 13, pp. 243–250 (1991).

Y. Hara et al., *A New Micro–Cutting Device with High Stiffness and Resolution*, Annals of the CIRP 39 pp. 375–378 (1990).

D. E. Luttrell, *Machining Non–Axisymmetric Optics*, Presented at the American Society for Precision Engineering Annual Conference, Rochester, N.Y. pp. 31–34 (Sep. 23–28 1990).

D. C. Thompson, *Theoretical Tool Movement Required to Diamond Turn an Off–Axis Paraboloid on Axis*, SPIE 93 Advances in Precision Machining of Optics, pp. 23–29 (1976).

M. Tomizuka et al., *Tool Positioning for Noncircular Cutting with Lathe*, Mechanical Engineering Department, University of California –Berkeley (1985).

Nanoform 600 Product Brochure, Published by Rank Pneumo, A Division of Rank Taylor Hobson Inc., 1990.

Primary Examiner—Bruce M. Kisliuk
Assistant Examiner—Derris H. Banks
Attorney, Agent, or Firm—Bell, Seltzer, Park & Gibson

[57] ABSTRACT

A turning machine includes a controller for generating both aspherical and non-symmetrical shape components defining the predetermined shape, and a controller for controlling a spindle and a positionable cutting blade to thereby form a predetermined non-rotationally symmetric shape in a workpiece surface. The apparatus includes a rotatable spindle for rotatably mounting the workpiece about an axis, a spindle encoder for sensing an angular position of the rotating workpiece, the cutting blade, and radial and transverse positioners for relatively positioning the cutting blade and workpiece along respective radial and transverse directions. The controller cooperates with a fast transverse positioner for positioning the cutting blade in predetermined varying transverse positions during a revolution of the workpiece.

36 Claims, 13 Drawing Sheets

FIG. 11

NCSU-PEC Fast Tool Servo Controller

| Part Name | | Units metric | | TPG Step 3 |
|---|---|---|---|---|
| ofxparb | | | | |
| | Surface Parameters | | off-Axis Translation | |
| Wr | 85.0000000 | X0 | 69.0000000 | |
| R | 600.000000 | Z0 | 3.99650000 | |
| K | -1.00000000 | Tilt | 0.113397754 rad | |

Asphere Sag
5.98179407

FTS Travel
0.0974480966

| | Asphere Coefficients | | Asphere Coefficients |
|---|---|---|---|
| A2 | 0.000827877478 | A12 | 1.80970954e-42 |
| A4 | 7.26515311e-12 | A14 | 4.99128329e-50 |
| A6 | 1.275127708e-19 | A16 | 1.42355511e-57 |
| A8 | 2.797751345e-27 | A18 | 4.16420147e-65 |
| A10 | 6.873990034e-35 | A20 | 1.242479854e-72 | conic part file "ofxparb" opened
conic part file "ofxparb" saved

F1 Off-Axis Conic
F2 Tilted Flat
F3 RTH Toolpath
F4 FTS Control
F5 DOS Command
F6 Configuration
ESC Exit F1 Part Name
F2 Units
F3 TFG Step Number
F4 Surface Parms
F5 Analyze Surface
F6 Signal Output
F7 Save Changes
ESC Main Menu

APPARATUS AND METHOD FOR FORMING A WORKPIECE SURFACE INTO A NON-ROTATIONALLY SYMMETRIC SHAPE

This invention was made with government support under Grant No. 78Y-XT910C awarded by the U.S. Department of Energy. The government has certain right in the invention. This is a continuation of application Ser. No. 08/138,163 filed on 15Nov. 1993 now abandoned.

FIELD OF THE INVENTION

This invention relates to the field of machines and methods for making surfaces having predetermined curved surfaces, and more particularly, to an apparatus and method for making optical surfaces.

BACKGROUND OF THE INVENTION

The fabrication of parabolic mirror surfaces is of interest to optical designers for both large and small telescopes. Typically these surfaces are created by fabricating the best fit spherical surface in glass by traditional grinding and polishing, then hand polishing the workpiece to form the desired aspherical shape. Finally, the glass surface is coated with a reflective material such as aluminum to complete the mirror.

As the need for larger mirror surfaces has grown, the idea of forming segments of a larger mirror, then assembling them into finished parabolic surface was conceived. For a large mirror, the parabolic shape may be made up of 40 or more sections, each of which is approximately one meter or more in diameter. For such an application, each segment may be fabricated by deforming it into a predetermined shape and polishing the deformed shape to a spherical contour. Removal of the bending loads causes the section to return to an unstrained condition in which it formed the desired aspherical shape.

The recent process of optical component fabrication known as diamond turning has dramatically changed the way reflective optical surfaces are now constructed. A diamond turning machine (DTM) typically includes a rotating spindle, and a diamond cutting tool that may be relatively positioned in two axes relative to the workpiece. An example of a typical DTM is the NANOFORM® 600 made by Rank Pneumo of Keene, N.H. In other words, the cutting tool may be positioned along a radius of the workpiece, as well as positioned in a z-direction or transverse direction into the workpiece to form a predetermined aspherical workpiece surface.

By machining an optical surface with a diamond cutting tool as described, nearly perfect reflective surfaces can be created in a fraction of the time required for the traditional grinding/polishing technology described above. In addition, fabrication is not limited solely to spherical shapes; rather, general aspherical shapes such as parabolas and cones can be fabricated as easily as spheres. Large DTM's have been constructed to fabricate parabolic surfaces as large as nearly two meters in diameter; however, segments of this diameter appear to be approaching the practical limit of such machines.

To facilitate formation of a non-rotational symmetric surface, it has been proposed that the desired surface shape may be modeled with best fit spherical components in combination with non-rotationally symmetric components. See, for example, Gerchman, "*A Description of Off-Axis Surfaces For Non-Axisymmetric Surface Generation*", submitted for presentation at the ECO3—International Congress on Optical Science & Engineering, The Hague, The Netherlands, SPIE Proceedings, Vol. 1266, Mar. 15, 1990, the entire disclosure of which is incorporated herein by reference.

A theoretical DTM disclosed in a paper by Thompson entitled "*Theoretical Tool Movement Required to Diamond Turn an Off-Axis Parabaloid On Axis*", SPIE, Vol. 93, pp. 23–29 (1976) includes an actuator that may be moved in the z-direction during a fraction of rotation of the workpiece. Accordingly, a non-rotational symmetric surface may be formed. In other words, off-axis parabolic segments may be fabricated on axis with a fast cutting tool motion in the z-direction and coordinated with the angular orientation of the workpiece.

The relatively fast movement of the cutting tool in the z-direction of a DTM as described in an article by Patterson et al. entitled "*Design and Testing of a Fast Tool Servo for Diamond Turning*", Precision Engineering, Vol. 7, No. 3, pp. 123–128 (1985) is obtained by a piezoelectric actuator including a series of stacked piezoelectric elements. Unfortunately, most commercially available DTM's do not include a suitable actuator for fast z-direction movement to form a non-rotationally symmetric workpiece surface. Moreover, conventional DTM's include controllers that are not suitable for operating an actuator for the relatively fast movement required.

Summary of the Invention

In view of the foregoing background it is therefore an object of the present invention to provide an apparatus and method for making large optical surfaces including segments having non-rotationally symmetric surfaces.

It is another object of the present invention to provide an apparatus and method for retrofitting to an existing DTM and being compatible with the controller and other components thereof.

These and other objects, features and advantages of the present invention are provided by an apparatus for shaping a workpiece surface to a predetermined non-rotationally symmetric shape, the apparatus including: shape component generating means for generating both aspherical and non-rotationally symmetric shape components together defining the predetermined shape, and a second controller including means for controlling a rotating spindle and positionable cutting blade for forming the predetermined shape from the shape components. The invention may preferably be directed to retrofitting commercially available turning machines typically incorporating diamond cutting blades, that is, diamond turning machines (DTM's).

The apparatus also includes spindle means for rotating the workpiece about an axis, spindle sensing means for sensing an angular position of the rotating workpiece, shaping means cooperating with the spindle means for removing portions of the rotating workpiece to shape the workpiece surface into the predetermined shape. The shaping means includes the cutting blade, radial positioning means for relatively positioning the cutting blade and workpiece along a radial direction relative to the axis of the workpiece, and transverse positioning means for relatively positioning the cutting blade along a transverse direction to the radial direction. The apparatus also preferably includes radial and transverse position sensing means for sensing respective relative radial and transverse positions of the cutting blade and the workpiece. Moreover, the apparatus also includes control means cooperating with the spindle means and the shaping means for positioning the cutting blade in predetermined varying transverse positions during a revolution of the workpiece responsive to the radial and transverse position sensing means and the spindle sensing means to thereby form the workpiece surface into the predetermined non-rotationally symmetric shape. The radial position sensing means is preferably a laser interferometer associated with the workpiece and the transverse position sensing means is preferably a capacitive sensor.

For a retrofit application, the control means includes the existing or first controller and a retrofitted or second controller according to this aspect of the invention. The first controller includes means for controlling the spindle and shaping means for forming an aspherical surface based upon corresponding aspherical shape components, and the second controller includes means for controlling the spindle and shaping means for forming the predetermined non-rotationally symmetric shape from corresponding non-rotationally symmetric shape components. In slightly different terms, the first controller preferably includes means cooperating with the transverse positioning means to position the cutting blade relatively slowly to form the workpiece surface into an aspherical shape, and the second controller includes means cooperating with the transverse positioning means to position the cutting blade relatively quickly to form the aspherical workpiece surface into the predetermined non-rotationally symmetric surface while the workpiece is rotated.

The second controller also preferably further includes radial position closed loop control means cooperating with the radial positioning means and its associated sensor for controlling the radial position of the cutting blade in a closed loop. Similarly, the second controller also preferably includes transverse position closed loop control means.

Yet another aspect of the present invention is that the second controller includes means for reading the radial position sensing means and memory means for storing the radial position. Since the first controller also requires the radial position, the second controller further includes synchronizing means for permitting the first controller to periodically read the radial position stored in the memory means while continually updating the radial position in the memory means.

The transverse positioning means has a relatively high operating speed to permit the cutting blade to be transversely repositioned during a fraction of a revolution of the workpiece. The transverse positioning means preferably includes a housing and a plurality of piezoelectric elements arranged in stacked relation within the housing so that the cutting blade is positionable in the transverse direction. A relatively high thermal conductivity epoxy coating preferably surrounds the piezoelectric elements to facilitate heat transfer therefrom. In addition, cooling means is preferably connected in fluid communication with the housing to cool the piezoelectric elements.

A method aspect of the present invention is for retrofitting a turning machine for aspherically shaping a workpiece surface to permit a retrofitted turning machine to shape a workpiece surface to a predetermined non-rotationally symmetric shape. The turning machine is of the type including spindle means for rotating the workpiece about an axis, spindle sensing means for sensing an angular position of the rotating workpiece, shaping means cooperating with the spindle means for removing portions of the rotating workpiece. The shaping means includes a cutting blade, radial positioning means for relatively positioning the cutting blade and the rotating workpiece along a radial direction relative to the axis of the rotating workpiece, and transverse positioning means for relatively positioning the cutting blade and the rotating workpiece along a transverse direction to the radial direction. Radial and transverse position sensing means are included for sensing respective radial and transverse positions of the cutting blade relative to the workpiece. The turning machine also includes a first controller including means for controlling the spindle means and the shaping means for forming an aspherical surface.

Thus, the method includes the steps of: generating both aspherical and non-rotationally symmetric shape components together defining the predetermined non-rotationally symmetric shape; operatively connecting a second controller to the spindle means, spindle sensing means, first controller, shaping means, radial position sensing means, transverse position sensing means, and shape component generating means; and operating the second controller to control the spindle means and the shaping means for positioning the cutting blade in predetermined varying transverse positions during a revolution of the workpiece responsive to the radial and transverse position sensing means and the spindle sensing means to form the workpiece surface into the predetermined non-rotationally symmetric shape from the shape components.

The second controller preferably also includes radial and transverse position closed loop control means. Accordingly, the method also preferably includes the step of controlling the radial and transverse positions of the cutting blade in respective closed loops responsive to the respective position sensing means. The second controller also preferably includes means for reading the radial position sensing means and memory means for storing the radial position so that the method further includes synchronizing the first and second controllers for permitting the first controller to periodically read the radial position in the memory means while continually updating the radial position in the memory means.

Because typical existing actuators are not fast enough to move the cutting blade in the transverse direction during only a portion of a revolution. The method also preferably includes the step of substituting a high speed transverse positioning means for the transverse positioning means of the turning machine. As described above, the high speed transverse positioning means preferably includes a housing and a plurality of piezoelectric elements arranged in stacked relation within said housing so that the cutting blade is repositionable in the transverse direction during a fraction of a revolution of the workpiece. The method also preferably includes the step of cooling the piezoelectric elements.

BRIEF DESCRIPTION OF THE DRAWINGS

FIG. 11 is a represented display screen generated by the controller according to the present invention.

DETAILED DESCRIPTION OF THE PREFERRED EMBODIMENT

The present invention will now be described more fully hereinafter with reference to the accompanying drawings and illustrative examples, in which preferred embodiments of the invention are shown. This invention may, however, be embodied in many different forms and should not be construed as limited to the embodiments set forth herein. Rather, applicants provide these embodiments so that this disclosure will be thorough and complete, and will fully convey the scope of the invention to those skilled in the art. Like numbers refer to like elements throughout.

Figure 1:
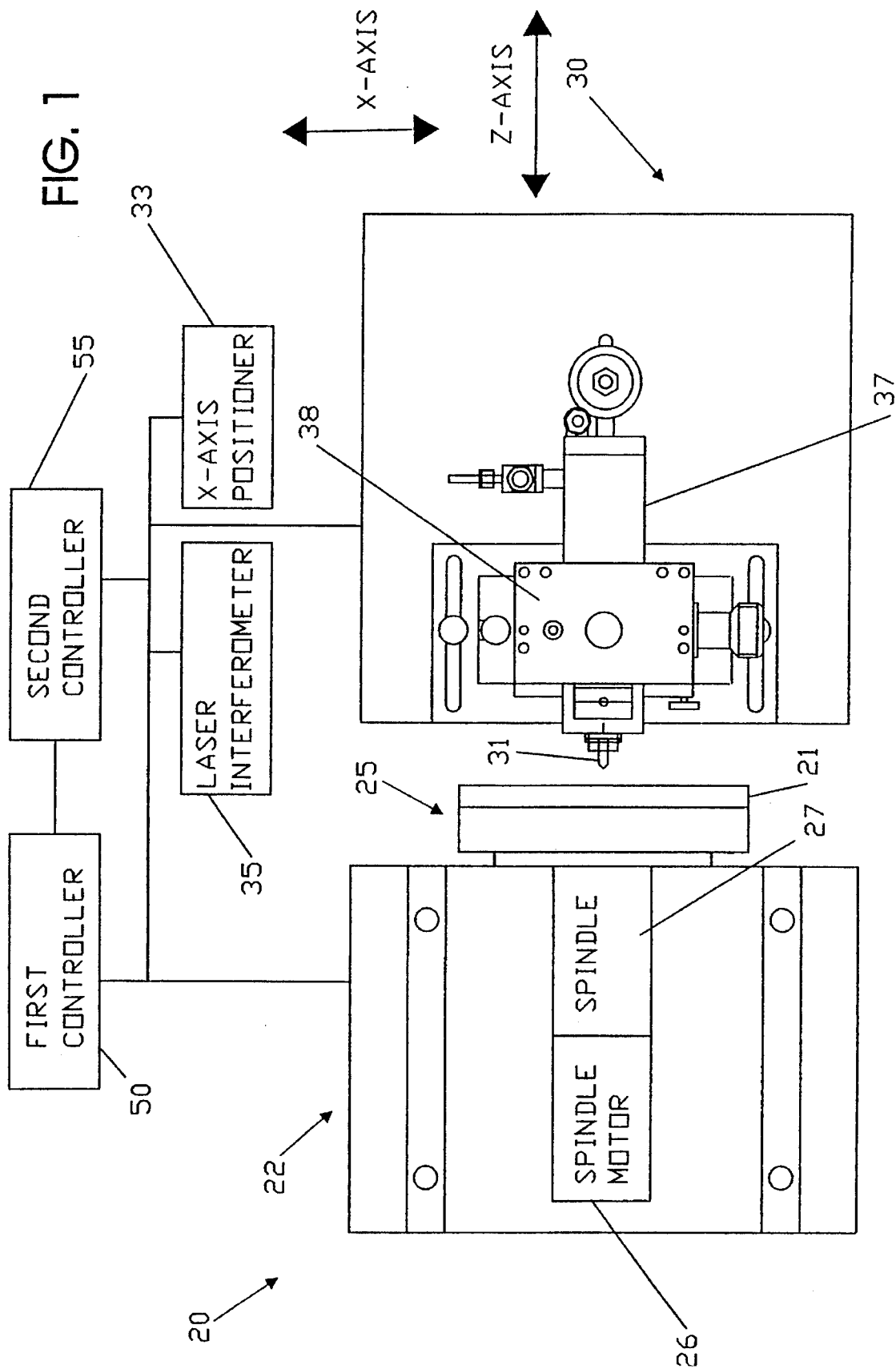
FIG. 1 is a plan view, partially in schematic form, of the apparatus according to the invention.
Figure 2:
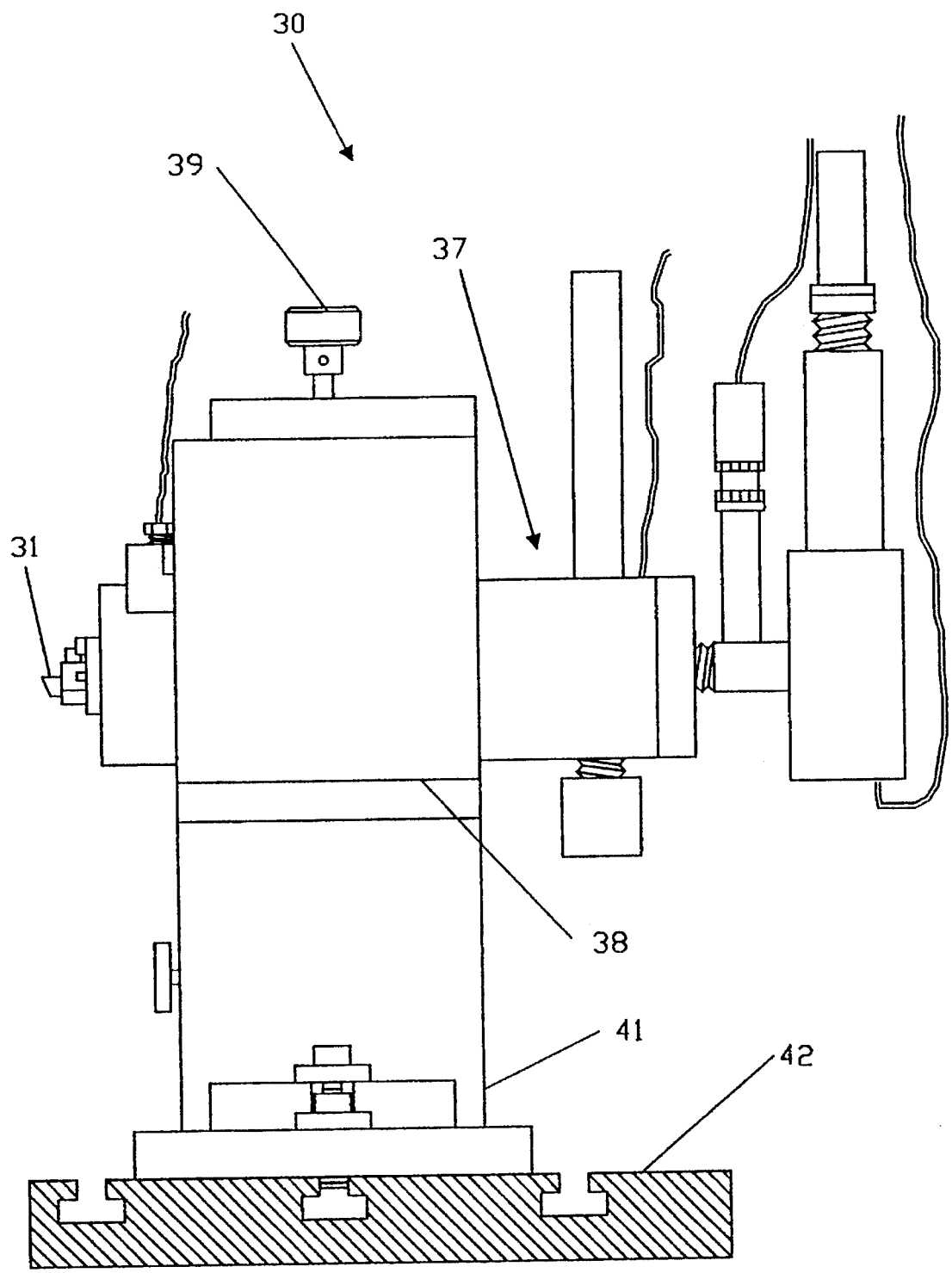
FIG. 2 is an enlarged side view of the cutting tool assembly as shown in FIG. 1.
Figure 3:
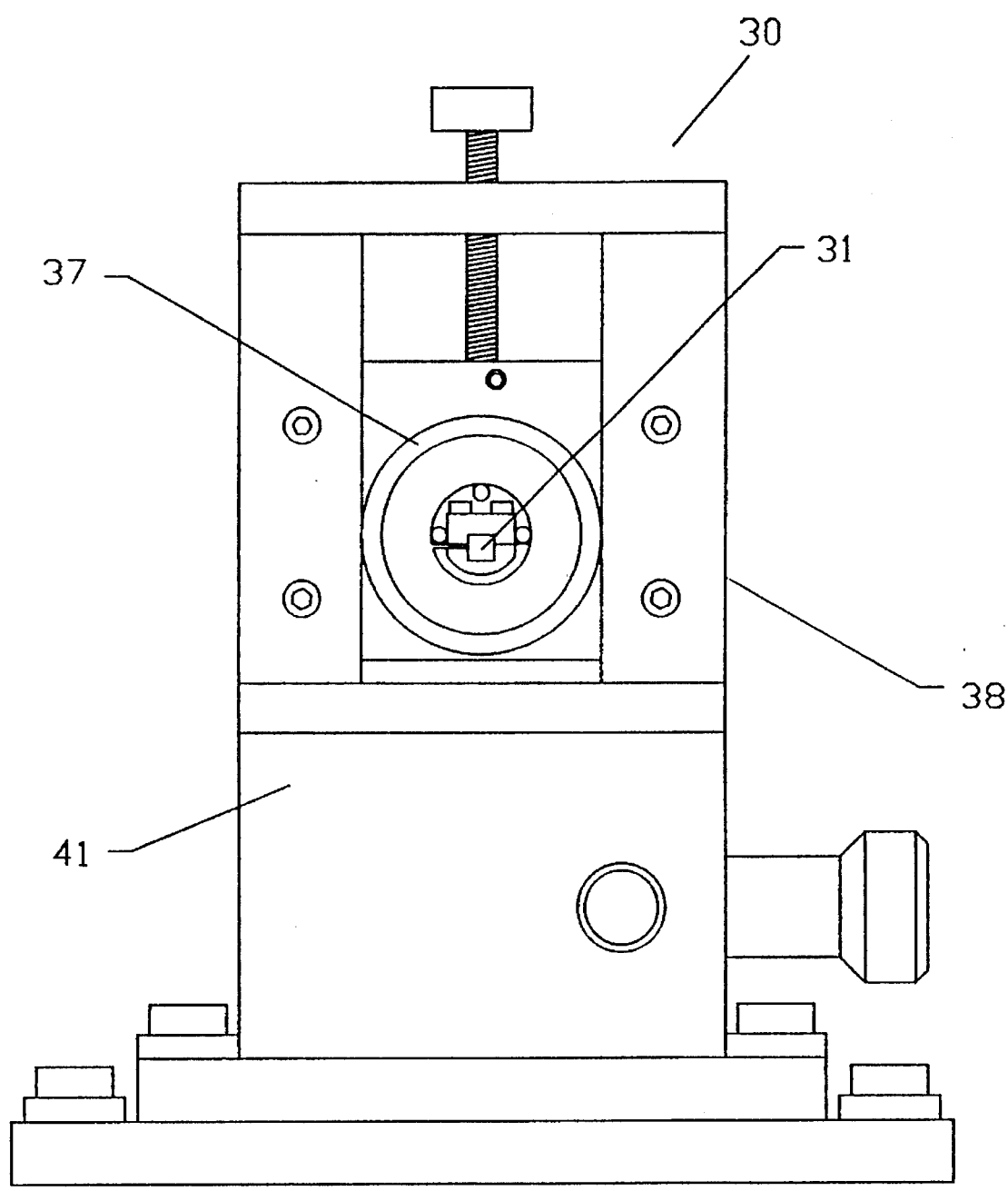
FIG. 3 is a front view of the cutting tool assemble as shown in FIG. 2.

Referring now first to FIGS. 1–3, an apparatus or diamond turning machine (DTM) according to the invention is illustrated broadly at 20. The illustrated DTM 20 is a retrofit application of a retrofit or second controller 55 and fast tool servo or high speed transverse positioning means 37 of the present invention to a conventional DTM. Such an application has great commercial applicability in view of the large capital cost of DTM's and the number of such conventional DTM's currently in use. The conventional DTM may be a NANOFORM® 600, available from Rank Pneumo, Keene, N.H., although those skilled in this art will appreciate that other machines may also be used. As would also be readily understood by those skilled in the art, the present invention also contemplates a DTM wherein all of the features of the present invention are incorporated into the DTM from its initial design. In other words, the aspects and features of the present invention in its retrofit embodiment may be readily incorporated into a single controller of a DTM.

The illustrated embodiment of the DTM 20 includes a cutting tool assembly 30, a spindle assembly 22, and a first controller or conventional x-y axis controller 50 and a second or fast servo or z-axis perturbation controller 55. The spindle assembly 22 includes a mounting chuck 25 on which the workpiece 21 is secured to rotate about a predetermined axis, a motor 26 for driving the chuck, and a spindle encoder or angular displacement sensor 27 for sensing the relative angular position of the chuck and workpiece 21. The chuck 25 is preferably a vacuum chuck having a series of concentric grooves (not shown) in the surface facing the workpiece 21 so that negative pressure applied to the grooves holds the workpiece 21 securely positioned.

The cutting tool assembly 30 includes a diamond cutting blade 31, means for moving the cutting blade in a radial direction or along the x-axis (schematically illustrated by Block 33), and a conventional laser interferometer (schematically illustrated by Block 35) for determining the radial or x-axis position of the cutting blade 31. In addition, the cutting tool assembly includes a fast tool servo or transverse positioner 37 for moving the cutting blade 31 along the a direction transverse to the surface of the workpiece 21 (the z-axis). The fast tool servo 37 is mounted to a post 38 including a coarse height adjusting knob 39. The post 38, in turn, is carried by a microheight adjuster 41 which is carried by a base 42.

The first controller 50 is of a conventional type for forming aspherical surfaces from the workpiece 21 using a conventional z-direction actuator. As would be readily understood by those skilled in the art, the conventional z-direction actuator includes a relatively small number of stacked piezoelectric plates. According to the retrofit aspect of the present invention, the conventional z-axis actuator is replaced by a fast tool servo 37 which includes a large number of piezoelectric elements to provide greater operating speed. Moreover, the second controller 55 interfaces with the laser interferometer, first controller 50, and other components to move the cutting blade 31 in small z-axis increments responsive to the spindle encoder 27 to form a non-rotationally symmetrical surface on the workpiece 21 as described in greater detail below.

Figure 4:
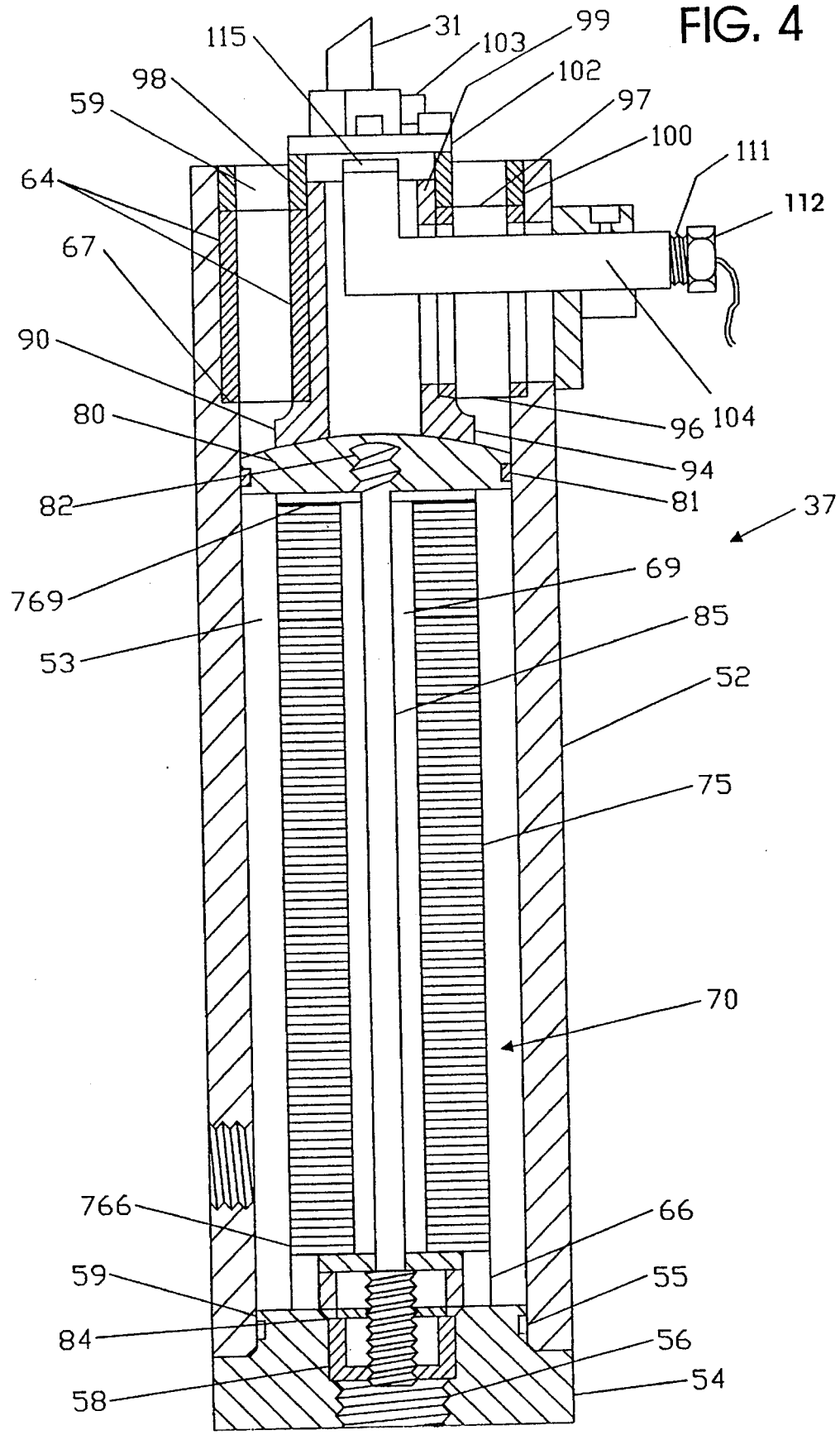
FIG. 4 is an enlarged cross-sectional view of the fast servo actuator of the cutting tool of FIG. 3.
Figure 5:
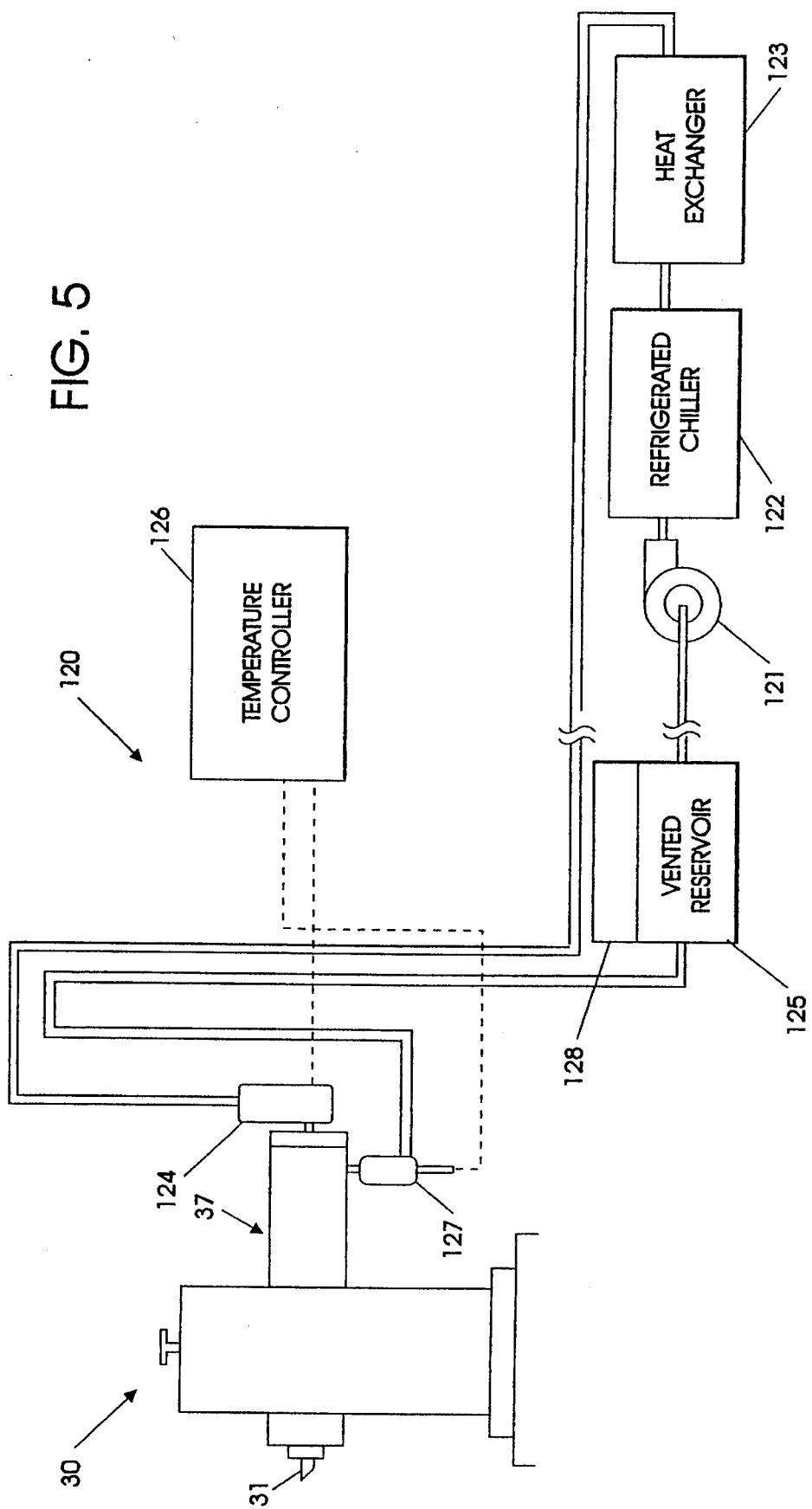
FIG. 5 is a schematic view of the fast servo actuator of FIGS. 3 and 4 illustrating connection to external cooling components.

Referring now additionally to FIGS. 4 and 5, the fast servo actuator 37 is described in greater detail. The fast servo actuator 37 is encased in a cylindrical housing 52 that defines an interior cavity. The interior surface of the forward end of the housing an opening 59 that is slightly larger than that of the opening defined by the interior surface of the rear end of the housing. The forward opening 59 extends rearwardly to terminate at a ridge 67 that merges the forward and rearward interior surfaces. A disk-shaped housing end cap 54 is releasably joined to the rear end of the housing 52 by a press-fit joint between the housing 52 and a sleeve 59 projecting from the end cap sealed by O-ring 55. A cooling inlet port 56 extends forwardly from the center portion of the rear surface of the housing end cap 54 and meets a pocket 58, that extends rearwardly from the front surface of the end cap 54. An annular cavity end cap 66 is positioned so that its rearward surface contacts the forward end of the end cap sleeve 59.

An annular piezoelectric stack 70 is positioned forwardly of and adjacent the cavity end cap 66. The stack 70 comprises a plurality of alternating lead zirconate titanate (LZT) disks and beryllium copper electrodes. LZT is the preferred material due to its significant voltage-induced expansion, although any material that expands due to voltage-induced dipolar alignment can be used. Each disk is fixed to the adjacent electrodes with a layer of epoxy, and the exterior surface of the stack 70 is also coated with an epoxy layer 75. Alternate electrodes are electrically connected in parallel to leads, each of which connects to an amplifier. Each of a pair of inactive LZT disks 76a, 76b is located at each of the opposite ends of the stack 70 for electrical insulation of the stack from the housing 52 and the endcap 66.

The stack 70 has a central 10 mm diameter tunnel 69 centered on its longitudinal axis for refrigerant flow. Cooling of the stack 70 occurs by convection of heat from the stack into cooling fluid present in the surrounding cavity 53; however, the actual rate of convection from the stack surfaces is limited by the rate of conduction through the stack itself. To raise the rate of conduction and thereby minimize the risk of overly high internal temperatures, the use of a high thermal conductivity epoxy 75 to coat the stack 70 is preferred.

A circular alignment cap 80 having an arcuate front surface contacts to the forward end of the stack 70. The alignment cap 80 is sized so that its radial edges slidably mate with the inner surface of the housing 52. An O-ring 81 encircling the peripheral edge of the cap 80 and contacting the inner surface of the housing 52 provides a seal therebetween. The head of a preload rod 82 is captured within the cap 80. The shaft 85 of the rod 82 projects rearwardly through the tunnel 69 central opening of the stack 70 and the opening in the cavity end cap 66 into the pocket 58 of the end cap 54, where its threaded end 86 is received by a pair of Belleville washers 84. Preferably, the shaft 82 is tightened so that the preload force on the stack 70 is approximately 1000N. It has been calculated that a preload force of this magnitude should prevent the brittle stack materials from catastrophic failure due to tensile stresses that might be present upon elongation without preloading. The rearward surface of the alignment cap 80 also includes four radially extending flow passages (not shown) to allow refrigerant to flow between the tunnel 69 and the portions of the cavity 53 surrounding the stack 70.

A tubular shuttle 90 contacts the forward surface of the alignment cap 80. The rearward surface of the shuttle 90 and the forward surface of the alignment cap 80 are matingly arcuate; as a result, negative performance effects due to misalignment of these mating surfaces are minimized. A flange 94 having a forwardly facing shoulder extends radially outwardly from the rearward end of the shuttle 90. The rearward face of an annular flexure plate 96 contacts the shoulder 95 and also contacts the ridge 67. A pair of concentric cylindrical spacers 64 contact and extend forwardly from the inner and outer portions, respectively, of the forward face of the flexure plate 96. The body of the shuttle 90 resides within the inner spacer 64. The spacers 64 contact at their forward ends the inner and outer portions respectively, of a forward flexure plate 97. An inner clamp ring 98 receives a threaded tubular post 99 projecting forwardly from the shuttle 90. This clamp ring 98 is tightened to compress the forward flexure plate 97, the inner spacer 64, and the rearward flexure plate 97 against the shoulder 95. As a result, the inner portions of the flexure plates move longitudinally with the shuttle 90. The forwardmost portion of the interior surface of the housing 52 receives threads located on the outer surface of an outer clamp ring 100. This clamp ring 100 can be tightened to compress the outer portion of the forward flexure plate 97, the outer spacer 64, and the outer portion of the rearward flexure plate 96 against the ridge 67 and fix these components relative to one another.

The flexure plates 96, 97 preload the moving mass (i.e., the tool, shuttle, etc.) to the stack 70 to ensure the desired dynamic response and positioning accuracy. The preload force applied to the shuttle 90 is due to the initial deflection of the flexure plates resulting from tightening of the housing end cap. The preload force magnitude can be calculated and is dependent on the magnitude of the moving mass at its maximum amplitude and frequency. For the illustrated embodiment, the moving mass (the shuttle, tool holder, and tool) is approximately 180 g. The acceleration of an object experiencing sinusoidal oscillation is $$\ddot{Z} = -Z\omega^2 \sin(wt) \qquad \text{(II)}$$

wherein $\ddot{Z}$ is the acceleration of the mass, Z is the oscillation amplitude, w is the oscillation frequency (in radians per second), and t is time. Assuming a 100 Hz sine wave oscillation of 50 μm amplitude, the maximum acceleration of the moving mass is approximately 21 m/sec$^2$. Using the mass and acceleration values and a factor of safety of four, the minimum preload force can be calculated as approximately 445N. For a flexure plate equivalent stiffness of approximately 1.9N/μm, the initial deflection of the flexure plates 96, 97 is 236 μm. Those skilled in this art will note that the calculated preload force should not be exceeded; as a higher preload force coupled with the dynamic deflection force could lead to fatigue failure in the flexure plates.

A front end cap 102 abuts the forward face of the inner clamp ring 98. Fixed to the forward face thereof is a tool holder 103, which releasably secures a diamond blade 31 in position to contact the workpiece 21.

The forward portion of the side wall of the housing 52 includes a capacitor gage aperture 111. The longer arm 113 of a right-angle capacitance probe 112 fits within the capacitor gage aperture 111 and extends vertically from a position above the housing 52 into the shuttle cavity 104. The shorter arm of the gage extends forwardly within the shuttle cavity 104 from a fixed perpendicular attachment to the lower end of the long arm. At the forwardmost end of the shorter arm is a capacitance detector 115. In this configuration, the capacitance gage 112 does not move with the shuttle 90. As the distance between the detector 115 and the front end cap 102 varies, the capacitance there between can be used to determine the position of the blade 31, and thereby allows calculation of the longitudinal position of the blade 31 relative to the workpiece 21. In the illustrated embodiment, the capacitance gage 112 is a Lion Precision PX405HA Custom right-angle capacitance probe. This probe senses the tool displacement and provides position feedback to the first and second controllers, 50, 55, over the 100 μm range of travel of the blade 31 with approximately 50 nm resolution. The nominal distance between the capacitance gage probe 112 and the tool holder 102 is 150 μm.

In operation, the capacitance probe is driven by a remote amplifier such as the RPD3 Amplifier Module available from Lino Precision. Position feedback from the amplifier module is sent to the controller in the form of a ±10 V DC analog signal. The analog position signal is included to enable the fast tool servo 37 to be calibrated and to compensate for the effects of hysteresis and nonlinearity in the stack 70.

The fast tool servo 37 illustrated herein can provide an actuation range for the tool of up to about 100 μm, a bandwidth of approximately 100 Hz, and an open-loop stiffness of approximately 70N/μm. The actuator motion is generated by the piezoelectric stack 70, which is driven by a 1000 VDC, 1 A High Voltage Amplifier (Trek, Inc. Model #P0617) electrically connected thereto. In operation, the stack 70 receives a voltage signal which is nominally proportional to the desired displacement. This voltage creates an electric field which rotates dipoles in the LZT discs, which in turn causes each disk in the stack to elongate. The elongation of each individual disk in the stack results in a stack 70 of expanded length. Since the stack 70 is longitudinally constrained by the cavity end cap 66, it must lengthen forwardly. Consequently, the alignment cap 90, shuttle 90, tool holder 102, and cutting blades are displaced forwardly. The forward and rearward flexure plates 96, 97 deflect and bias the assembly rearwardly as the shuttle 90 is actuated forwardly. When the voltage is removed, the stack length decreases; the flexure plates 96, 97 force the shuttle 90 to remain in contact with the alignment cap 80, which draws the tool holder 102 and tool 110 rearwardly as the stack 70 retracts.

The fast tool servo 37 includes an optional cooling system 120 to counteract hysteretic heating in the stack 70 that could diminish performance through excessive thermal expansion or contraction of the stack 70, or, in extreme cases, cause deterioration and fracture of the stack. Operating the stack 70 at full extension at 100 Hz produces approximately 60 Watts of heating; therefore it is desirable to cool the stack 70 to withdraw a like amount of heat.

The cooling system 120, illustrated schematically in FIG. 5, includes a centrifugal pump 121, a refrigerated chiller 122, a continuously operating heat exchanger 123, an intermittently operating heat exchanger 124, the cavity 53 of the actuator housing 52, and a vented reservoir 125. These components are serially and fluidly connected by standard refrigeration conduit. The reservoir 125 and intermittent heat exchanger 124 are located inside a temperature-controlled room along with the DTM 20 and are not insulated. The pump 121, chiller 122, and a continuously operating heat exchanger 123 are located outside the temperature-controlled room to minimize the heat generated in the temperature-controlled environment.

In the illustrated embodiment, the cooling system 120 is designed so that the bulk of the fluid will remain at a room temperature setpoint of 22.2° C. The high-head/low-flow centrifugal pump 121 circulates a refrigerant (Dow Corning 200® Silicone Fluid is preferred due to its dielectric strength (14.8 volt/μm), specific heat (0.36 cal/g/cm), and low viscosity (10 centistokes)) through the system 120 at a flow rate of approximately four liters per minute. The fluid is from the reservoir 125 via the circulating pump 121 and directed through the open-loop controlled refrigerated chiller 122, where heat is extracted from the fluid (approximately 350–400 watts). The fluid then passes to and through the continuously operating heat exchanger 123, which employs three 100-watt cartridge heaters. This heat exchanger 123 transfers a large majority of the heat transferred to the fluid by the system 120; however, the quantity of heat transferred therein is less than the amount of heat removed to ensure that the temperature of the fluid will remain lower than the setpoint temperature as it approaches the servomechanism 50.

Immediately before entering the fast tool servo 37, the fluid passes through the intermittently operating heat exchanger 124, which employs a 150-watt cartridge heater. Operation of this heat exchanger 124 is controlled by an Omega CN9121 microprocessor temperature controller 126 which gathers temperature data obtained with a T-type thermocouple 127 mounted on the outlet of the housing 52 and, based on this data, switches the cartridge heater "on" and "off" to maintain the temperature of the fluid exiting the housing 52 at the setpoint temperature. Thus, with the fluid leaving an exit orifice at the setpoint temperature, the fast tool servo 37 should thermally equilibrate, and thermal expansion/contraction of its components should be minimized. In the event that the difference between the actual temperature and the setpoint temperature exceeds the programmed tolerance, the temperature controller 126 will cause the controllers 50, 55 to cease operation. The system also includes a pressure fault detector 128 mounted on the reservoir 125. In the event that a low-pressure condition is detected, the pressure switch will signal the controllers 50, 55 to cease operation.

Figure 7:
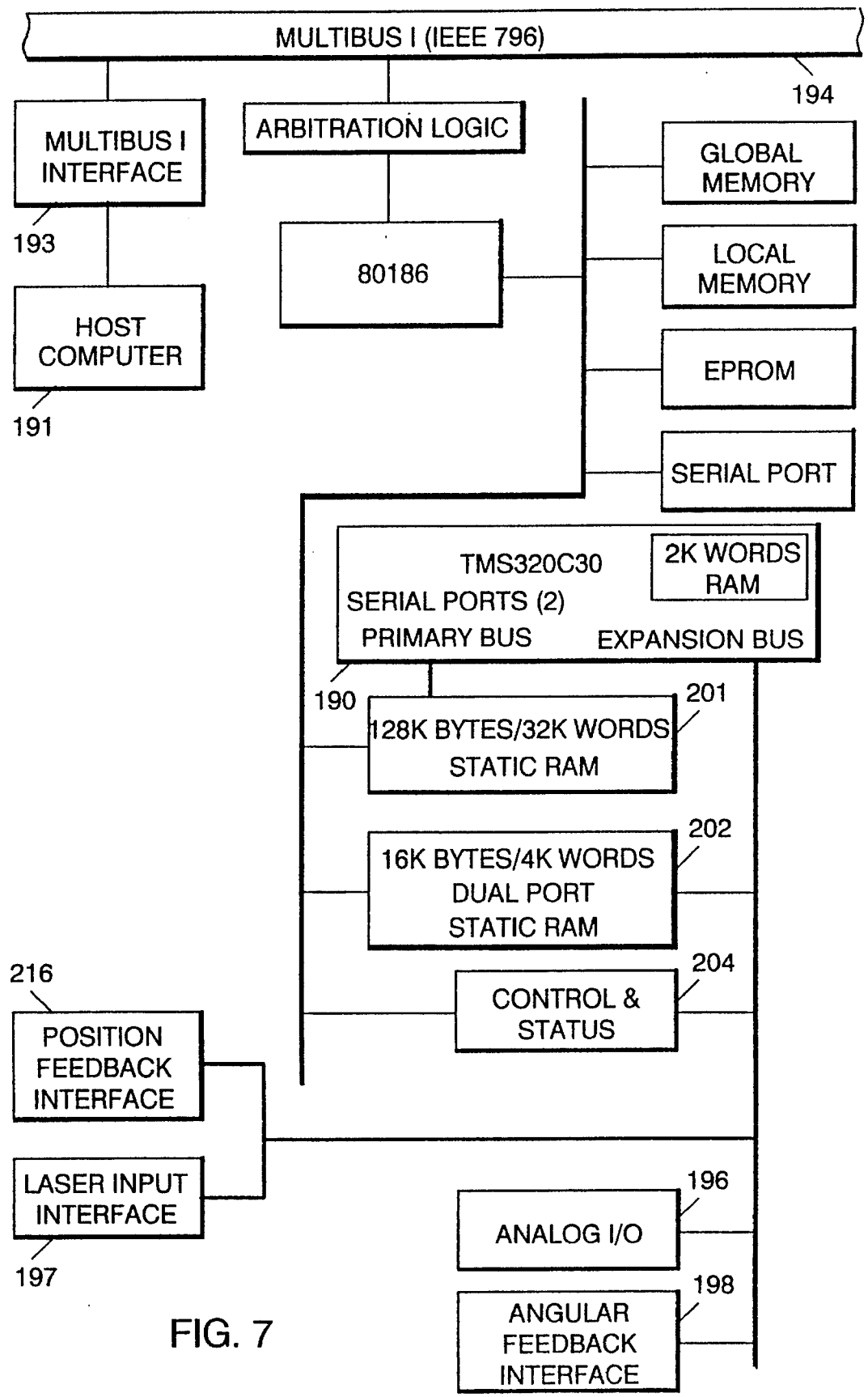
FIG. 7 is another schematic block diagram of the retrofit controller of the apparatus according to the invention.

As described above, the spindle assembly 22 presents a rotating workpiece 21 for sharping the workpiece surface. In order to produce a desired non-rotationally symmetric surface on the workpiece, radial and transverse motions must be coordinated. Control means provides the integration of the separate devices to enable the apparatus 20 to produce the desired surface on the workpiece 21. The control means includes a first controller 50, a second controller 55, a host computer 152, a node controller 160, a digital signal processor (DSP) 180, and input/output (I/O) interface 182 between the spindle encoder, the capacitance gage, and the laser interferometer. The host 152 interfaces The computer architecture used to control the apparatus 20 has been described as a Heterogeneous Hierarchical Architecture for Real-Time ($H^2ART$). This description refers to a class of architectures which feature multiple heterogeneous processors connected through a hierarchy of busses to produce computational results in bounded, predictable time. The control means uses a $H^2ART$ system with a single TMS320C30 digital signal processor (DSP) node 190 as shown in FIG. 7. An 80386-based PC-AT type computer 191 serves as the system host and is interfaced to the Multibus I (IEEE 796) 194 by a commercially available AT-Multibus I adapter 193 manufactured by Bit-3. In addition to the AT-Multibus I adapter card, there are five other boards in the Multibus I card cage. These are the node controller 160, the DSP 190, the analog I/O 196, the laser interferometer interface 197 and the spindle encoder interface 198. Further discussions of these components follow.

The node controller 160 is based on the Intel 80186 microprocessor and is responsible for communication between the host computer 152 and the DSP 190. It has 128K bytes of random-access memory (RAM) 201, 64K of which can be accessed by the host computer while the other 64K is private (i.e., can only be accessed by the 80186 on the card). This board also contains a monitor in read-only memory (ROM) and a serial input/output (I/O) port for processor initialization and debugging.

The digital signal processor (DSP) board collects data from the analog I/O board, the laser board and the spindle interface board, then uses this data to position the fast tool servo 37. The DSP board contains a Texas Instruments TMS320C30 DSP, 128K bytes/32K words of memory shared with the node controller, 16K bytes/4K words of memory 202 dual ported with the node controller and an I/O interface. The address, data and control signals are interconnected between the node controller and the DSP board with 50-pin ribbon cables. A third 50-pin connector on the DSP board is the I/O interface. The DSP board is connected to the Multibus I backplane for power only. Communications between the node controller and the DSP are handled by the control and status ports 204. Bits in the control port also allow the node controller to start and stop the DSP and determine whether the DSP or node controller has access to the 128K byte/32K word shared memory. Access to the dual port memory is arbitrated by hardware integrated into the dual-port memory chips.

The analog I/O board has four channels of analog output and three channels of analog input, but the controller 55 uses only one output channel and one input channel. The analog output channel uses a 16-bit digital-to-analog (D/A) converter with a fixed range of −10 to +10 volts. The analog output is connected to the Trek high voltage amplifier which, in turn, drives the piezoelectric stack 70 in the fast tool servo 37 and positions the cutting blade 31. The analog input channel uses a 12-bit analog-to-digital (A/D) converter which is programmed for a −10 to +10 volt range by jumpers on the board. The analog input comes from a capacitance gage 112 mounted on the fast tool servo which gives the controller the z-axis position of the cutting blade. A status bit on the A/D converter tells when a conversion has been completed and valid data is ready for transfer to DSP. The A/D conversion time is approximately 15 µs.

The Laser Interferometer Interface Board has two functions; a laser input interface that lets the DSP control the laser interferometer's operation and read slide position data and a position feedback interface 210 that gives the first controller 50 on the Nanoform 600 laser data when it is needed.

Figure 8:
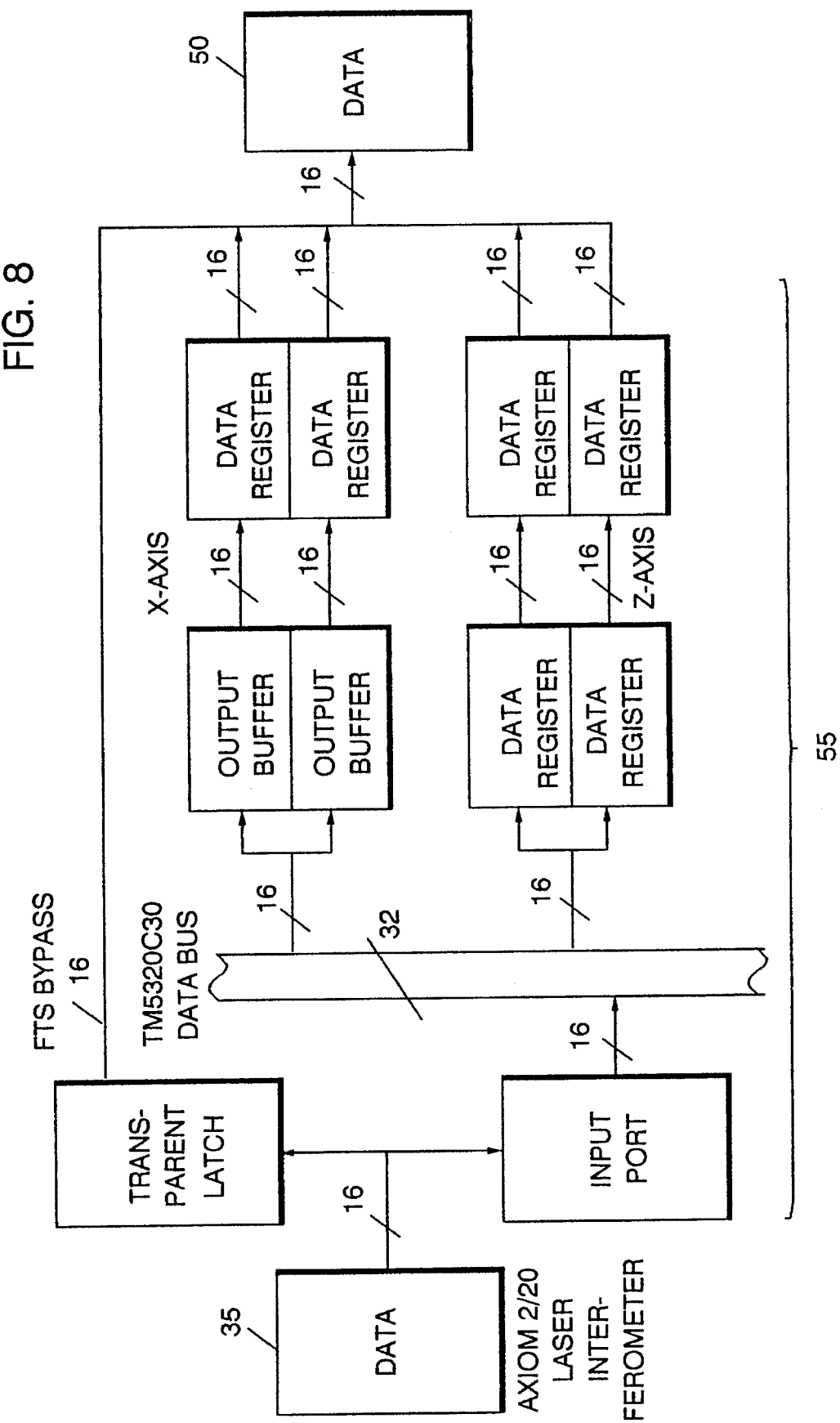
FIG. 8 is a schematic block diagram of the fast servo controller portion of the retrofit controller according to the invention.

Both the second controller and the first controller need position data from the Zygo Axiom 2/20 laser interferometer 35 to function properly. Since the second controller 55 needs this data at a faster rate than the first controller, it controls the transfer of data from the laser interferometer through its laser input interface. The DSP reads the 32-bit slide position data from the laser interferometer as two 16-bit words, and, in addition to using the data to calculate the fast servo actuator position, writes it to an output buffer (FIG. 8). This data is then transferred to a set of data registers which can be accessed by the first controller through the position feedback interface. This transfer takes place after the DSP has written both 16-bit halves of the slide position data to the output buffer unless the first controller is reading the corresponding data register. If the first controller is in the process of reading the data register, no transfer takes place. The update cycle of the second controller ensures that the data received by the first controller is not more than 100 µs old. It must be pointed out that this scheme works because the second controller is operating much faster than the first controller. If the data rates were the same, a different method of synchronization would be needed to avoid a possible deadlock situation. In one iteration of this interface, the data was transferred from the output buffer to the data register when the IBH controller requested data, but the interface was greatly simplified by transferring the data in the manner described above.

The position feedback interface has circuitry that emulates the response of the Axiom 2/20 to control signals and the first thinks that it is communicating with the laser interferometer directly. The data registers respond to the first controller's data request and address signals. In addition, requests from the first controller to initialize the laser interferometer are passed to the second controller which passes them to Axiom 2/20.

A set of transparent latches that bypass the second controller and connect the first controller directly to the Axiom 2/20 is included on this board. These latches, which are activated from the second controller control panel, allow the second controller to be removed from or placed into the control loop without having to plug or unplug cables.

Figure 9:
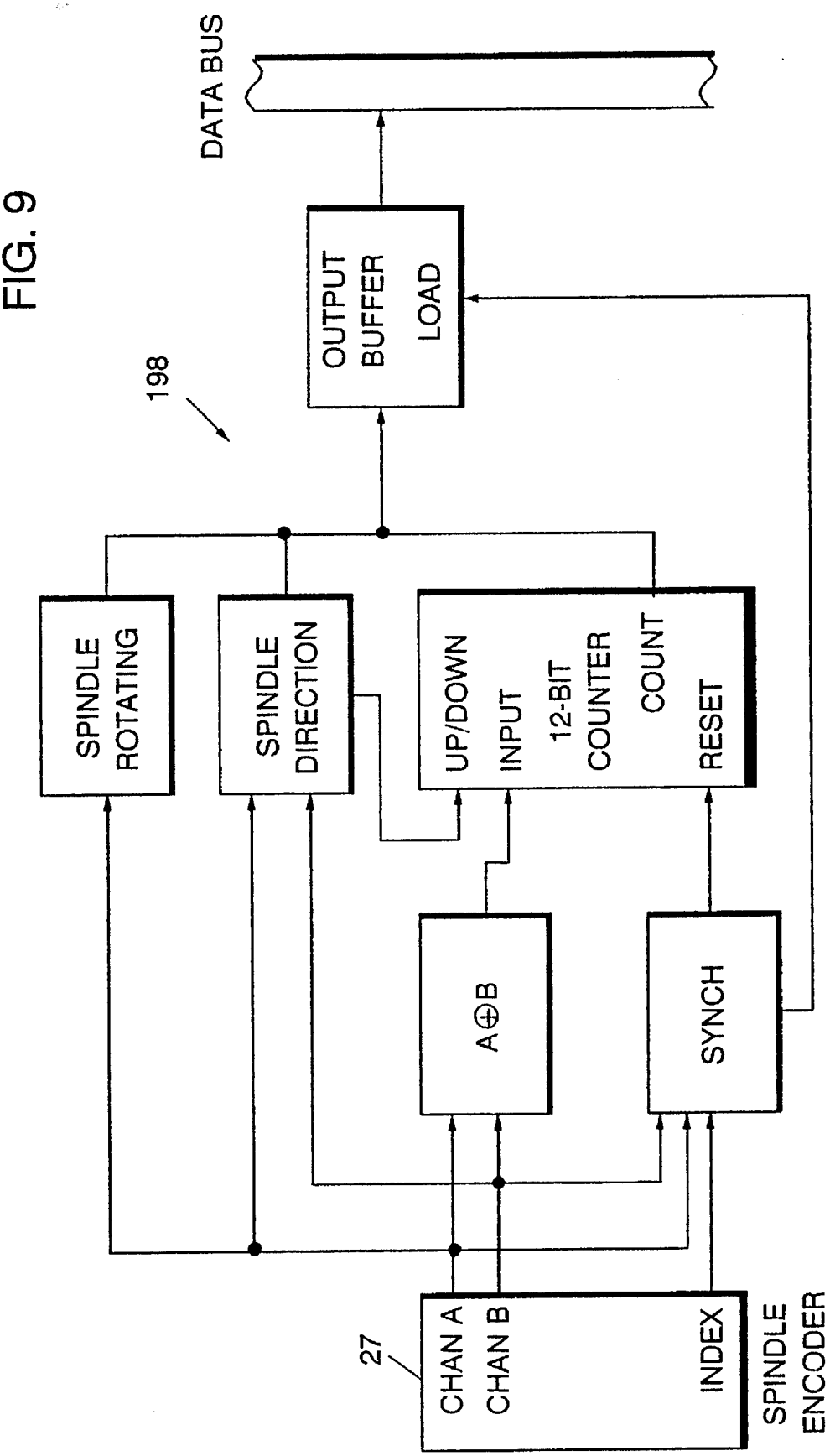
FIG. 9 is a schematic block diagram of the spindle encoder portion of the retrofit controller according to the invention.
Figure 10:
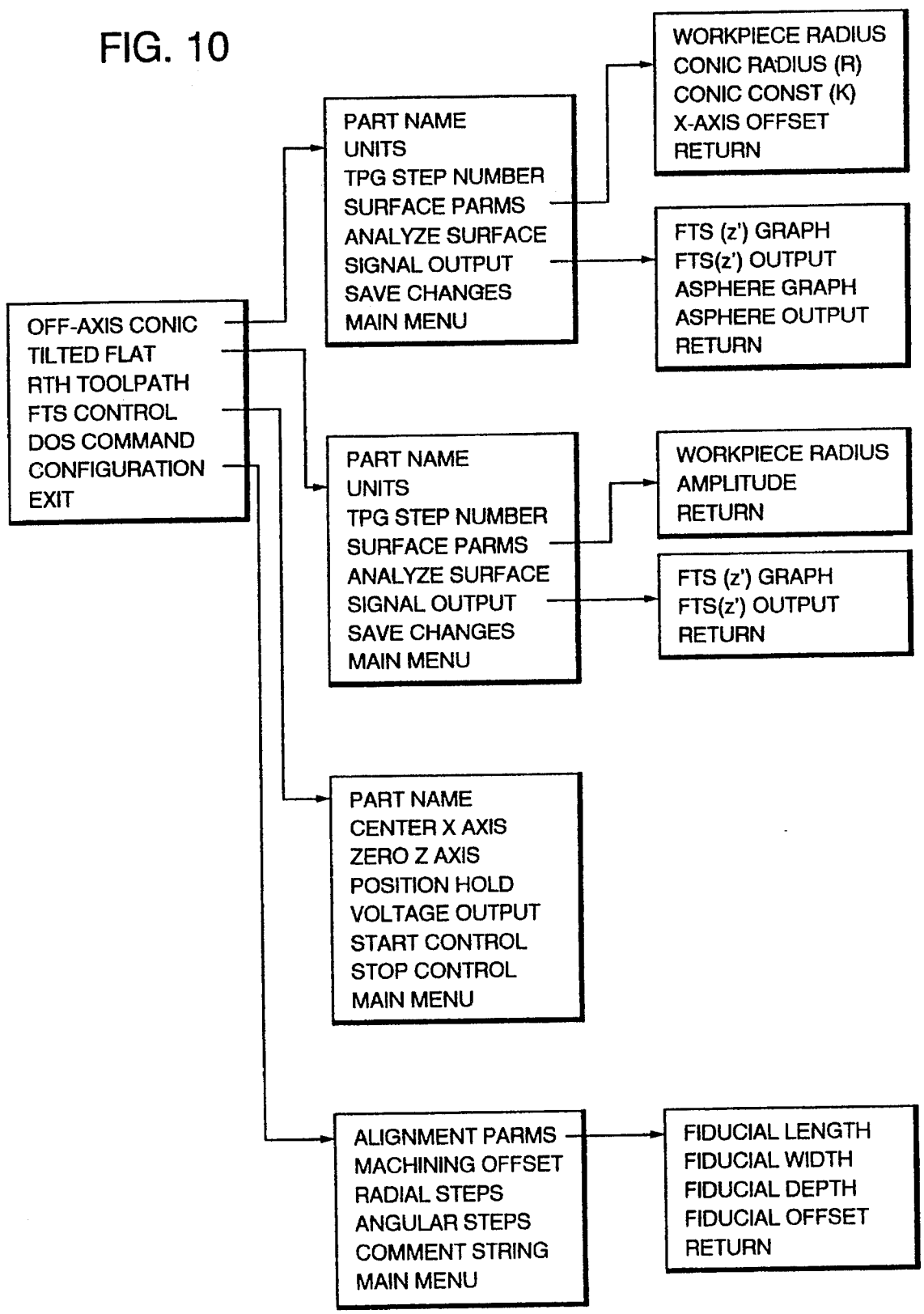
FIG. 10 is a block diagram illustrating a menu hierarchy for the controller according to the invention.

The spindle encoder interface 198 is desirably included on the laser interface board (FIG. 9). Angular feedback is derived from the spindle encoder on the DTM 20. The output from the spindle encoder consists of two 2048 pulse-per-revolution channels in quadrature (i.e., channels are 90 degrees out of phase) and a once-per-revolution index marker. The two 2048 pulse-per-revolution channels are exclusive-OR-ed to give a 4096 pulse-per-revolution signal which increments or decrements a 12-bit counter depending upon the direction of the spindle's rotation. The DSP can read the value in this counter and determine the spindle's angular position. This interface also has bits to tell the DSP if the spindle is rotating and its direction of rotation. The once-per-revolution index pulse resets the counter at the end of each revolution and is also used to determine the angular alignment of the workpiece.

The spindle encoder 27 preferably includes a buffer placed between the output of the counter and the DSP bus, and logic is included to prevent the transfer of data from the counter to the buffer while the DSP is reading data from the buffer. The index pulse is also clocked into the reset input of the counter to prevent false zeroing due to jitter on the index pulse. The inputs from the spindle encoder 27 are optically isolated.

Non-rotationally symmetric surfaces can be machined on-axis by using the high-bandwidth second controller 55 to generate small perturbation z-axis motions that are synchronized with the rotation of the workpiece 21. The remainder (or base) surface is described by a best-fit aspheric surface of revolution. This base surface is rotationally symmetric and can be machined by a standard two-axis DTM. The algebraic decomposition of a surface described by the universal optics equation into symmetric (aspheric) and non-symmetric components has been previously reported in the Gerchman article described above.

Figure 6:
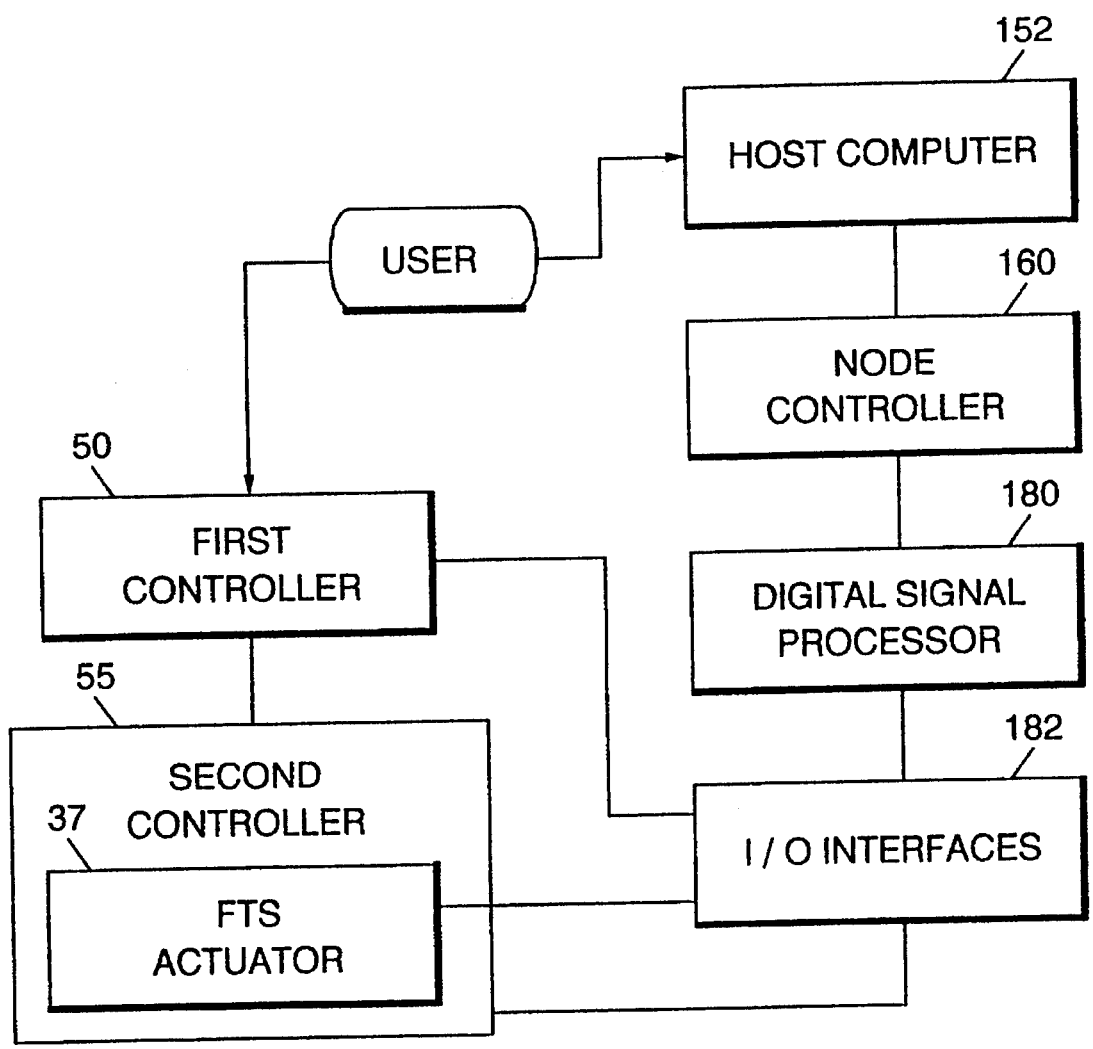
FIG. 6 is a schematic block diagram of the computer and controller connections of the apparatus according to the invention.

There are three major software components in the overall control means of the DTM 20. The graphical user interface (GUI) executes on the host PC-AT, the communications interface (CI) on the $H^2ART$ node controller, and the second controller functions on the $H^2ART$ digital signal processor. The interconnections between these software components and the hardware are illustrated in FIG. 6.

A principle consideration in the implementation plan for the GUI software component may be code reusability. The menu and window handlers consist of modules that can be easily extracted from the second controller library and modified for other applications requiring a similar layout (e.g., a $H^2ART$ based DTM controller). Many of the low-level functions of the second controller are self-contained library modules that can be linked to other control applications. The major control components (i.e., control cycle interrupt handler) will be very similar in other applications. However, much of the code is hardware specific and can only be used as an example for other control projects.

The second controller user interface is preferably a graphical, menu driven, window oriented interface to the control software. In addition to initiating the servo feedback control functions it provides part design and decomposition facilities and an interface to the first controller. The menu hierarchy is shown in FIG. 9.

Figure 12:
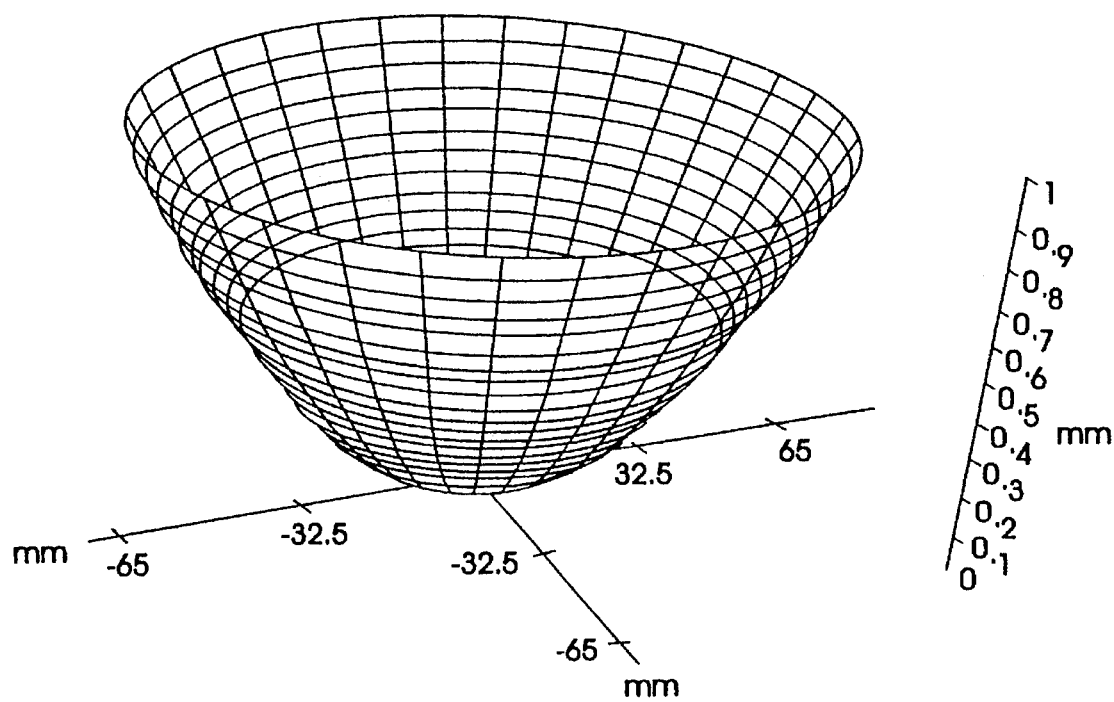
FIGS. 12 and 13 are a perspective view of a best fit aspheric surface component and a non-symmetrical surface component, respectively, used for forming a workpiece surface according to the invention.
Figure 13:
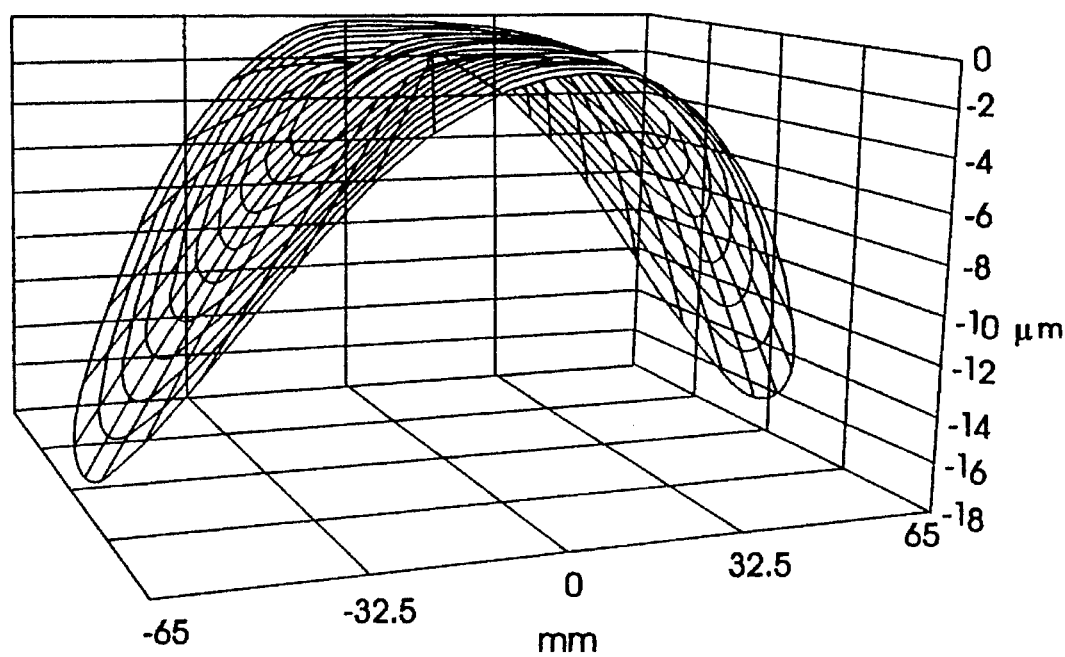
Figure 14:
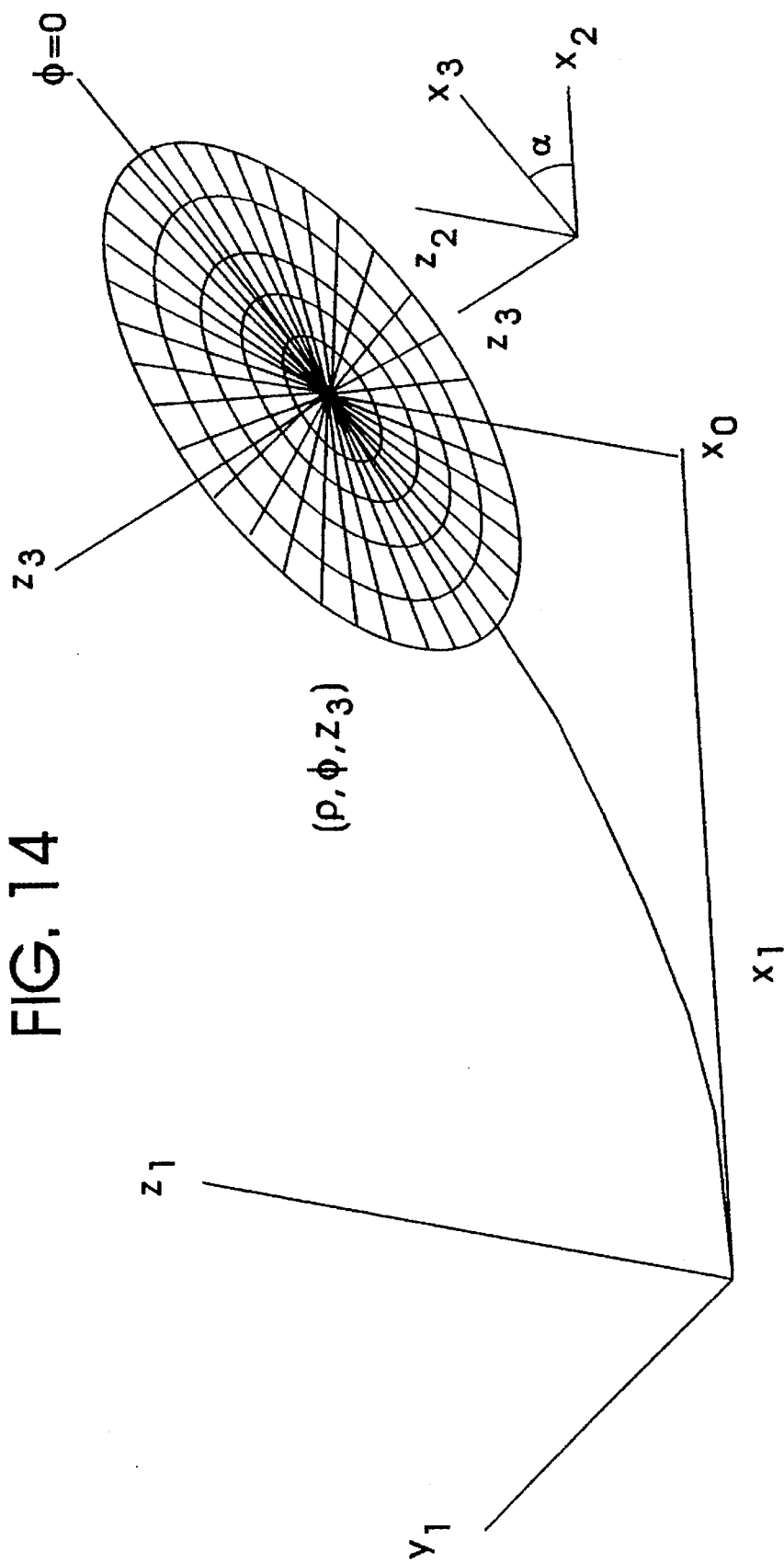
FIG. 14 is a perspective view of a off-axis conic surface produced by a best-fit aspherical component and a non-symmetrical component as shown in FIGS. 12 and 13.

After entering the parameters defining the type of surface (off-axis conic or tiled-flat), the specified optic must be analyzed to determine the range of servo motion required during machining. A by-product of surface analysis for off-axis conics, as shown in FIG. 14 for example, is the generation of aspheric polynomial constants describing the best-fit asphere to be machined by two-axis DTM as shown, for example in FIG. 12. Both the aspheric (FIG. 12) and the nonsymmetric components (FIG. 13) can be plotted on the screen or saved in an ASCII format file. If the surface parameters are acceptable to the user, they can be saved on disk for later use by the second controller. When saved, the required asphere parameters are also written to a file suitable for input to the RTH Toolpath Generator. This provides a mechanism for programming the first controller to machine the symmetric surface component.

The feedback control menu provides functions for workpiece setup, actuator calibration and machining activities. Periodic calibration of the capacitance gage requires the capability of extending the actuator in fixed voltage increments. Before machining, the user must execute functions for locating the workpiece surface and spindle center with respect to the fast tool servo. This provides a reference frame for interpretation of the laser interferometer input.

A flexible object-oriented design is preferably used to link menu selections with display items, windows, and action functions. The menu parser is structured as an envelope function that is driven by a statically defined linked data structure. Each element of this linked data structure corresponds to a single menu item and contains a pointer to the function that performs the desired action when that item is selected and executed by the user. Menu selections are executed by either pressing the corresponding function-key or using the arrow-keys to highlight the desired item and then pressing the return key. Mouse support can easily be added to the menu system. Other features of the manu parser include automatic scrolling to the default next selection after executing a menu item, integrated data entry routines that include error handling, and a context sensitive input history editor. This greatly improves data entry speed for more experienced users.

The user interface screen is preferably divided into five nonoverlapping text windows. Graphical output (i.e., 2D surface plots) occupy the entire screen when they are displayed. Two windows on the left side of the screen are used for menu display. The main menu is always displayed in its own window. The currently active submenu occupies the other menu window. The information window displays data relevant to the current menu or submenu selection (e.g., current machine status, part program parameters). The message window is used to display error messages and confirmation prompts. The status window is transparent unless the hardware status is unacceptable for normal control system functions. In this case, the relevant message is displayed in flashing red letters under the submenu window. FIG. 11 shows a typical screen display after selecting "F1 Off-Axis Conic" from the main menu and creating and saving the part file "ofxparb" from the submenus.

Each window object is organized as a collection of lower-level screen objects. Screen objects consist of an object type tag, display coordinates and attributes (i.e., colors), a lock variable for synchronizing the real-time display update process with data entry functions, and a pointer to the internal program variable associated with the object (e.g., workpiece radius variable). The object type tag is used by the menu parser to execute the appropriate screen update and/or data input function when the parent menu item is executed.

The communications interface software consists of a single program that services requests from the hose computer to change the state of the $H^2ART$ system. The DSP memories and control ports are not accessible from the host or other multibus processors. Thus, action on the part of the 80186 node controller is required in order to down-load code, start, and halt the DSP processors. The communications software is also responsible for buffering data between the DSP control program and the host. This includes sending commands to change the state of the second controller activity as a result of command selections via the user interface software.

The second controller program executes on the C30 DSP. Its primary functions are servo feedback control for the fast tool servo and off-axis conic and tiled-flat reference signal generation. In the case of an off-axis conic, the second controller assumes that the DTM axes are machining the best-fit asphere calculated by the user interface. Appropriate tool and slide geometry corrections are the responsibility of the two-axis DTM controller and its software. In the case of the NANOFORM system this is handled by the RTH Toolpath Generator. The second controller reference signal is a function of both the angular rotation of the spindle and the radial position of the tool with respect to the workpiece.

Two tasks execute on the DSP. The main line task is a command loop monitor. It simply waits for the execution of a control menu item from the GUI and changes the state of the control task accordingly. At 10 KHz intervals as on-chip timer interrupts the DSP command loop monitor to execute the feedback control task. This task generates the next point on the reference surface (conic or tilted-flat) and executes the feedback control function to modify the output signal to the high-voltage amplifier that drives the actuator's piezoelectric stack. The feedback control is PID with a reference signal feedforward term. The control task is also responsible for saving relevant machine data in dual port memory for subsequent retrieval and display by the GUI.

Even when the second controller is idle, the laser interface hardware must also be serviced in order to maintain up-to-date axis position feedback information for the first controller. Several utility functions are also provided to assist in the setup and calibration of the actuator. These include both open-loop fixed voltage and closed-loop fixed position functions.

In the darwings and specification, there have been disclosed typical preferred embodiments of the invention and, although specific terms are employed, they are used in a generic and descriptive sense only and not for purposes of limitation, the scope of the invention being set forth in the following claims.

That which is claimed is:

1. An apparatus for shaping a workpiece surface to a predetermined non-rotationally symmetric shape, said apparatus comprising:

spindle means for rotating the workpiece about an axis;

spindle sensing means for sensing an angular position of the rotating workpiece;

shaping means cooperating with said spindle means for removing portions of the rotating workpiece to shape the workpiece surface into the predetermined non-rotationally symmetric shape, said shaping means comprising a cutting blade, radial positioning means for relatively positioning said cutting blade and said rotating workpiece along a radial direction relative to the axis of the rotating workpiece, and transverse positioning means for relatively positioning said cutting blade and said rotating workpiece along a transverse direction to the radial direction;

radial and transverse position sensing means for sensing respective relative radial and transverse positions of said cutting blade and the workpiece, and control means cooperating with said spindle means and said shaping means for positioning said cutting blade in predetermined varying transverse positions during a revolution of the workpiece responsive to the radial and transverse position sensing means and the spindle sensing means to form the workpiece surface into the predetermined non-rotationally symmetric shape, said control means comprising shape component generating means for generating both aspherical and non-rotationally symmetric shape components together defining the predetermined non-rotationally symmetric shape, a first controller comprising means for controlling said spindle means and said shaping means for forming an aspherical surface based upon corresponding aspherical shape components, and a second controller comprising means for controlling said spindle means and said shaping means for forming the predetermined non-rotationally symmetric shape from corresponding non-rotationally symmetric shape components.

2. An apparatus according to claim 1 wherein said first controller includes means cooperating with said transverse positioning means to position said cutting blade relatively slowly to form the workpiece surface into an aspherical shape; and wherein said second controller includes means cooperating with said transverse positioning means to position said cutting blade relatively quickly to form the aspherical workpiece surface into the predetermined non-rotationally symmetric surface.

3. An apparatus according to claim 1 wherein said second controller further comprises radial position closed loop control means cooperating with said radial positioning means and said radial position sensing means for controlling the radial position of said cutting blade in a closed loop.

4. An apparatus according to claim 1 wherein said second controller further comprises transverse position closed loop control means cooperating with said transverse positioning means and said transverse position sensing means for controlling the transverse position of said cutting blade in a closed loop.

5. An apparatus according to claim 1 wherein said second controller comprises means for reading said radial position sensing means and memory means for storing the radial position; wherein said first controller includes means for reading the radial position from the memory means of the second controller; and wherein said second controller further comprises synchronizing means for permitting said first controller to periodically read the radial position in the memory means while continually updating the radial position in the memory means.

6. An apparatus according to claim 1 wherein said radial position sensing means comprises a laser interferometer associated with the workpiece.

7. An apparatus according to claim 1 wherein said transverse positioning means has a relatively high operating speed to permit said cutting blade to be transversely repositioned during a fraction of a revolution of the workpiece.

8. An apparatus according to claim 7 wherein said second positioning means comprises a housing and a plurality of piezoelectric elements arranged in stacked relation within said housing so that said cutting blade is positionable in the transverse direction.

9. An apparatus according to claim 8 wherein said second positioning means further comprises a relatively high thermal conductivity epoxy coating surrounding the piezoelectric elements to facilitate heat transfer therefrom.

10. An apparatus according to claim 7 further comprising cooling means in fluid communication with said housing to cool said piezoelectric elements.

11. An apparatus according to claim 1 wherein said transverse position sensing means comprises a capacitive sensor operatively connected to said transverse positioning means.

12. An apparatus for shaping a workpiece surface to a predetermined non-rotationally symmetric shape, said apparatus comprising:

spindle means for rotating the workpiece about an axis;

spindle sensing means for sensing an angular position of the rotating workpiece;

shaping means cooperating with said spindle means for removing portions of the rotating workpiece to shape the workpiece surface into the predetermined non-rotationally symmetric shape, said shaping means comprising a cutting blade, radial positioning means for relatively positioning said cutting blade and said rotating workpiece along a radial direction relative to the axis of the rotating workpiece, and transverse positioning means for relatively positioning said cutting blade and said rotating workpiece along a transverse direction to the radial direction;

radial and transverse position sensing means for sensing respective relative radial and transverse positions of said cutting blade and the workpiece; and control means cooperating with said spindle means and said shaping means for positioning said cutting blade in predetermined varying transverse positions during a revolution of the workpiece responsive to the radial and transverse position sensing means and the spindle sensing means to form the workpiece surface into the predetermined non-rotationally symmetric shape, said control means further comprising radial position closed loop control means cooperating with said radial positioning means and said radial position sensing means for controlling the radial position of said cutting blade in a closed loop.

13. An apparatus according to claim 12 wherein said second controller further comprises transverse position closed loop control means cooperating with said transverse positioning means and said transverse position sensing means for controlling the transverse position of said cutting blade in a closed loop.

14. An apparatus according to claim 12 wherein said control means further comprises shape component generating means for generating both aspherical and non-symmetrical shape components together defining the predetermined non-rotationally symmetric shape.

15. An apparatus according to claim 14 wherein said control means comprises first and second controllers; wherein said first controller comprises means for controlling said spindle means and said shaping means for forming an aspherical surface based upon corresponding aspherical shape components; and wherein said second controller comprises means for controlling said spindle means and said shaping means for forming the predetermined non-rotationally symmetric shape from corresponding non-rotationally symmetric shape components.

16. An apparatus according to claim 12 wherein said control means comprises first and second controllers; wherein a first controller includes means cooperating with said transverse positioning means to position said cutting blade relatively slowly to form the workpiece surface into an aspherical shape; and wherein said second controller includes means cooperating with said transverse positioning means to position said cutting blade relatively quickly to form the aspherical workpiece surface into the predetermined non-rotationally symmetric surface.

17. An apparatus according to claim 12 wherein said control means comprises first and second controllers; wherein said second controller comprises means for reading said radial position sensing means and memory means for storing the radial position; wherein said first controller includes means for reading the radial position from the memory means of the second controller; and wherein said second controller further comprises synchronizing means for permitting said first controller to periodically read the radial position in the memory means while continually updating the radial position in the memory means.

18. An apparatus according to claim 12 wherein said radial position sensing means comprises a laser interferometer associated with the workpiece.

19. An apparatus according to claim 12 wherein said transverse positioning means has a relatively high operating speed to permit said cutting blade to be transversely repositioned during a fraction of a revolution of the workpiece.

20. An apparatus according to claim 19 wherein said second positioning means comprises a housing and a plurality of piezoelectric elements arranged in stacked relation within said housing so that said cutting blade is positionable in the transverse direction.

21. An apparatus according to claim 20 wherein said second positioning means further comprises a relatively high thermal conductivity epoxy coating surrounding the piezoelectric elements to facilitate heat transfer therefrom.

22. An apparatus according to claim 19 further comprising cooling means in fluid communication with said housing to cool said piezoelectric elements.

23. An apparatus according to claim 12 wherein said transverse position sensing means comprises a capacitive sensor operatively connected to said transverse positioning means.

24. A retrofit apparatus for retrofitting a turning machine for aspherically shaping a workpiece surface to permit a retrofitted turning machine to shape a workpiece surface to a predetermined non-rotationally symmetric shape, the turning machine of the type including spindle means for rotating the workpiece about an axis, spindle sensing means for sensing an angular position of the rotating workpiece, shaping means cooperating with the spindle means for removing portions of the rotating workpiece, the shaping means comprising a cutting blade, radial positioning means for relatively positioning the cutting blade and the rotating workpiece along a radial direction relative to the axis of the rotating workpiece, and transverse positioning means for relatively positioning the cutting blade and the rotating workpiece along a transverse direction to the radial direction, radial and transverse position sensing means for sensing respective relative radial and transverse positions of the cutting blade and the workpiece, and a first controller comprising means for controlling the spindle means and the shaping means for forming an aspherical surface; said retrofit apparatus comprising:

shape component generating means for generating both aspherical and non-rotationally symmetric shape components together defining the predetermined non-rotationally symmetric shape; and a second controller adapted to be operatively connected to the spindle means, spindle sensing means, first controller, shaping means, radial position sensing means, transverse position sensing means, and shape component generating means, said second controller comprising means for controlling the spindle means and the shaping means for positioning said cutting blade in predetermined varying transverse positions during a revolution of the workpiece responsive to the radial and transverse position sensing means and the spindle sensing means to form the workpiece surface into the predetermined non-rotationally symmetric shape from the shape components.

25. An apparatus according to claim 24 wherein said second controller further comprises radial position closed loop control means cooperating with said radial positioning means and said radial position sensing means for controlling the radial position of said cutting blade in a closed loop.

26. An apparatus according to claim 24 wherein said second controller further comprises transverse position closed loop control means cooperating with the transverse positioning means and the transverse position sensing means for controlling the transverse position of said cutting blade in a closed loop.

27. An apparatus according to claim 24 wherein said second controller comprises means for reading the radial position sensing means and memory means for storing the radial position; and wherein said second controller further comprises synchronizing means for permitting the first controller to periodically read the radial position in the memory means while continually updating the radial position in the memory means.

28. An apparatus according to claim 24 further comprising a high speed transverse position means adapted to be substituted for the transverse positioning means of the turning machine, said high speed transverse positioning means comprising a housing and a plurality of piezoelectric elements arranged in stacked relation within said housing so that the cutting blade is repositionable in the transverse direction during a fraction of a revolution of the workpiece.

29. An apparatus according to claim 28 wherein said high speed transverse positioning means further comprises a relatively high thermal conductivity epoxy coating surrounding the piezoelectric elements to facilitate heat transfer therefrom.

30. An apparatus according to claim 29 further comprising cooling means in fluid communication with said housing to cool said piezoelectric elements.

31. A method for retrofitting a turning machine for aspherically shaping a workpiece surface to permit a retrofitted turning machine to shape a workpiece surface to a predetermined non-rotationally symmetric shape, the turning machine of the type including spindle means for rotating the workpiece about an axis, spindle sensing means for sensing an angular position of the rotating workpiece, shaping means cooperating with the spindle means for removing portions of the rotating workpiece, the shaping means comprising a cutting blade, radial positioning means for relatively positioning the cutting blade and the rotating workpiece along a radial direction relative to the axis of the rotating workpiece, and transverse positioning means for relatively positioning the cutting blade and the rotating workpiece along a transverse direction to the radial direction, radial and transverse position sensing means for sensing respective relative radial and transverse positions of the cutting blade and the workpiece, and a first controller including means for controlling the spindle means and the shaping means for forming an aspherical surface, said retrofit method comprising the steps of:

generating both aspherical and non-rotationally symmetric shape components together defining the predetermined non-rotationally symmetric shape; and operatively connecting a second controller to the spindle means, spindle sensing means, first controller, shaping means, radial position sensing means, transverse position sensing means, and shape component generating means; and operating the second controller to control the spindle means and the shaping means for positioning the cutting blade in predetermined varying transverse positions during a revolution of the workpiece responsive to the radial and transverse position sensing means and the spindle sensing means to form the workpiece surface into the predetermined non-rotationally symmetric shape from corresponding non-rotationally symmetric shape components.

32. A method according to claim 31 further comprising the step of controlling the radial position of the cutting blade in a closed loop responsive to the radial position sensing means.

33. A method according to claim 31 further comprising the step of controlling the transverse position of the cutting blade in a closed loop responsive to the transverse position sensing means.

34. A method according to claim 31 wherein the second controller includes means for reading the radial position sensing means and memory means for storing the radial position; and further comprising the step of synchronizing the first and second controllers for permitting the first controller to periodically read the radial position in the memory means while continually updating the radial position in the memory means of the second controller.

35. A method according to claim 31 further comprising the step of substituting a high speed transverse positioning means for the transverse positioning means of the turning machine, the high speed transverse positioning means comprising a housing and a plurality of piezoelectric elements arranged in stacked relation within the housing so that the cutting blade is repositionable in the transverse direction during a fraction of a revolution of the workpiece.

36. A method according to claim 35 further comprising the step of cooling the piezoelectric elements.

* * * * *